US012722984B2

(12) United States Patent
Zhao et al.

(10) Patent No.: US 12,722,984 B2
(45) Date of Patent: Sep. 1, 2026

(54) AGGLOMERATION-LIKE MULTI-ELEMENT CATHODE MATERIAL, PREPARATION METHOD THEREFOR, AND LITHIUM-ION BATTERY

(71) Applicant: BEIJING EASPRING MATERIAL TECHNOLOGY CO., LTD., Beijing (CN)

(72) Inventors: Tianmeng Zhao, Beijing (CN); Shunlin Song, Beijing (CN); Yafei Liu, Beijing (CN); Yanbin Chen, Beijing (CN)

(73) Assignee: BEIJING EASPRING MATERIAL TECHNOLOGY CO., LTD., Beijing (CN)

( * ) Notice: Subject to any disclaimer, the term of this patent is extended or adjusted under 35 U.S.C. 154(b) by 66 days.

(21) Appl. No.: 19/006,221

(22) Filed: Dec. 31, 2024

(65) Prior Publication Data

US 2025/0128962 A1 Apr. 24, 2025

Related U.S. Application Data

(63) Continuation of application No. PCT/CN2022/135490, filed on Nov. 30, 2022.

(30) Foreign Application Priority Data

Oct. 31, 2022 (CN) ........................ 202211352231.X

(51) Int. Cl.
*C01G 53/504* (2025.01)
*H01M 10/0525* (2010.01)

(52) U.S. Cl.
CPC ...... *C01G 53/504* (2025.01); *H01M 10/0525* (2013.01); *C01P 2002/72* (2013.01);
(Continued)

(58) Field of Classification Search
CPC .............. C01G 53/504; H01M 10/0525; C01P 2002/72; C01P 2002/03; C01P 2002/32;
(Continued)

(56) References Cited

U.S. PATENT DOCUMENTS

2020/0161650 A1 5/2020 Park et al.
2023/0129261 A1* 4/2023 Chun .................... C01G 53/42 429/231.95

FOREIGN PATENT DOCUMENTS

CN 1581543 A 2/2005
CN 103296249 A 9/2013
(Continued)

OTHER PUBLICATIONS

Grant Notice dated Jul. 25, 2025 received in corresponding patent family application No. CN202211352231.X. English translation attached.

(Continued)

*Primary Examiner* — James Lee

(57) ABSTRACT

Provided are an agglomeration-like multi-element cathode material, a preparation method therefor, a use thereof, and a lithium-ion battery. The chemical formula of the agglomeration-like multi-element cathode material is $Li_aNi_xCo_yMn_zM_bO_2$, wherein $0.9 \le a \le 1.1$, $0.5 \le x < 1$, $0 < y < 0.5$, $0 < z < 0.5$, and $0 \le b < 0.05$; and M is at least one of V, Ta, Cr, La, Al, Ce, Er, Ho, Y, Mg, Sr, Ba, Ra, Zr, Fe, Ca, Zn, B, W, Nb, Cd, Pb, Si, Mo, Cu, Sr, and Ti. The multi-element cathode material is secondary particles formed by agglomeration of primary particles. The primary particles are spherical or spherical-like and have an average particle size $D_S$ ranging from 0.9 to 2.4 μm. The secondary particles have an average particle size $D_L$ ranging from 5 to 15 μm. A value of $D_L/D_S$ ranges from 5 to 16. The agglomeration-like
(Continued)

multi-element cathode material has high energy density, good rate capability, and excellent cycle stability.

20 Claims, 2 Drawing Sheets

(52) U.S. Cl.
CPC ...... *C01P 2004/03* (2013.01); *C01P 2004/32* (2013.01); *C01P 2004/50* (2013.01); *C01P 2004/51* (2013.01); *C01P 2004/61* (2013.01); *C01P 2004/62* (2013.01); *C01P 2006/12* (2013.01); *C01P 2006/40* (2013.01)

(58) Field of Classification Search
CPC .............. C01P 2002/50; C01P 2002/51; C01P 2002/61; C01P 2002/62; C01P 2006/12; C01P 2006/40
See application file for complete search history.

(56) References Cited

FOREIGN PATENT DOCUMENTS

| | | | |
|---|---|---|---|
| CN | 105185962 | A | 12/2015 |
| CN | 108206281 | A | 6/2018 |
| CN | 111370677 | A | 7/2020 |
| CN | 112750999 | A | 5/2021 |
| JP | 2008130287 | A | 6/2008 |
| JP | 2012113823 | A | 6/2012 |
| JP | 2015018803 | A | 1/2015 |
| JP | 2020515010 | A | 5/2020 |
| WO | 2013015069 | A1 | 1/2013 |
| WO | 2020202745 | A1 | 10/2020 |
| WO | 2022103105 | A1 | 5/2022 |
| WO | 2022154603 | A1 | 7/2022 |

OTHER PUBLICATIONS

Notice of Reasons for Refusal dated Sep. 2, 2025 received in corresponding patent family application No. JP2024577269. English translation attached.

Notice of Reasons for Refusal dated Jun. 24, 2025 received in corresponding patent family application No. JP2024577269. English translation attached.

Written Opinion dated Jul. 18, 2023 in International Application No. PCT/CN2022/135490. English translation attached.

International Search Report dated Jul. 18, 2023 in International Application No. PCT/CN2022/135490. English translation attached.

First Office Action dated Jan. 27, 2025 received in corresponding patent family application No. CN202211352231.X. English translation attached.

Extended European Search Report dated Dec. 4, 2025 received in corresponding European Application No. EP22964229.3.

First Office Action dated Dec. 17, 2025 received in corresponding European Application No. EP22964229.3.

Decision to Grant dated Nov. 18, 2025 received in corresponding patent family application No. JP2024577269. English translation attached.

First Office Action dated Feb. 4, 2026 received in corresponding patent family application No. KR1020247043056. English translation attached.

* cited by examiner

AGGLOMERATION-LIKE MULTI-ELEMENT CATHODE MATERIAL, PREPARATION METHOD THEREFOR, AND LITHIUM-ION BATTERY

CROSS REFERENCE TO RELATED APPLICATIONS

This application is a continuation of International Application No. PCT/CN2022/135490, filed on Nov. 30, 2022, which claims benefits of Chinese patent application No. 202211352231.X, filed on Oct. 31, 2022. The disclosures of the aforementioned applications are hereby incorporated by reference in their entireties.

FIELD

The present disclosure relates to the technical field of lithium-ion batteries, and specifically, relates to an agglomeration-like multi-element cathode material, a preparation method therefor, and a lithium-ion battery.

BACKGROUND

In recent years, energy and environmental issues have attracted more and more attention. New energy vehicles in the world have gradually developed from hybrid power to the main power of batteries. Battery electric vehicles and plugin hybrid electric vehicles have become the main part of new energy under the support government policies.

High safety and long endurance become the development trend of electric vehicles. In order to meet higher demands of the electric vehicles, power lithium batteries need to have higher energy density and better cycle stability. In the industrial chain of lithium batteries, the part with the largest market scale and the highest output value lies in the cathode material, and the performances of the cathode material may determine the energy density, service life, rate capability, etc. of a battery. Therefore, the cathode material has become a pivotal material of a lithium battery.

A ternary material has the characteristics of high energy density, good cycle stability and high safety. Currently, the dominant ternary materials on the market are in the form of agglomerated material and single crystal material. The agglomerated material is good in rate capability and slightly poor in cycle performance. The single crystal material has good cycle performance, smaller particle size, but low production efficiency and slightly poor rate capability.

In order to obtain a cathode material having high energy density and good structural stability, it is necessary to reasonably design the structure of the material and simultaneously balance the energy density, rate capability and cycle stability.

A micron-sized platy single crystal structural aggregate of a ternary cathode material and a preparation method therefor have been disclosed in the related art, in which a microspherical precursor is for the first time prepared by tightly stacking nanosheets by using an improved chemical co-precipitation method. The precursor has $D_{50}$ ranging from 6 to 8 μm. Then, the above-mentioned precursor is sufficiently mixed with an appropriate amount of flux and lithium salt in sequence. Finally, two-step high-temperature sintering is performed in a high-temperature sintering furnace to obtain the ternary cathode material of the micron-sized platy single crystal structural aggregate. Although the ternary cathode material has the combined advantages of both the single crystal structure and the aggregate structure, the platy single crystal structure has a relatively low compressive strength, the aggregate formed by the platy structure can hardly form a regular sphere, and primary particles are difficult to tightly stack and have weaker binding forces therebetween. Further, fracture and slip among the primary particles likely occur during fabrication of electrode plates, which leads to structural collapse and a poorer cycle performance; and gaps of grain boundaries of the aggregate stacked by the platy structure are larger, the grain boundaries and surfaces thereof are not protected by the coating layers with good ductility. Thus, during battery cycling, the electrolyte can easily reach the surfaces of the primary particles through the grain boundaries, and the primary particles may be eroded by the electrolyte from the surfaces to the interiors, thereby leading to a decrease in the cycle retention rate.

SUMMARY

A first aspect of the present disclosure provides an agglomeration-like multi-element cathode material having a structure represented by formula I:

$$Li_aNi_xCo_yMn_zM_bO_2 \quad \text{formula I;}$$

in formula I: $0.9 \le a \le 1.1$, $0.5 \le x < 1$, $0 < y < 0.5$, $0 < z < 0.5$, and $0 \le b < 0.05$; and M is at least one of V, Ta, Cr, La, Al, Ce, Er, Ho, Y, Mg, Sr, Ba, Ra, Zr, Fe, Ca, Zn, B, W, Nb, Cd, Pb, Si, Mo, Cu, Sr, and Ti.

The multi-element cathode material is secondary particles formed by agglomeration of primary particles. The primary particles are spherical or spherical-like and have an average particle size $D_S$ ranging from 0.9 μm to 2.4 μm. The secondary particles have an average particle size $D_L$ ranging from 5 μm to 15 μm. A value of $D_L/D_S$ ranges from 5 to 16.

A second aspect of the present disclosure provides a preparation method for an agglomeration-like multi-element cathode material. The preparation method includes:

(1) mixing a nickel source, a first cobalt source, a manganese source, a complexing agent and a precipitant for co-precipitation reaction to obtain slurry; and performing aging, filter-pressing, washing, and drying on the slurry in sequence, to obtain a nickel cobalt manganese ternary precursor;

(2) mixing the nickel cobalt manganese ternary precursor and a lithium source for first high-temperature sintering, and performing crushing and sieving in sequence, to obtain an agglomeration-like cathode material in-process product; and (3) mixing the agglomeration-like cathode material in-process product and a second cobalt source for second high-temperature sintering, and performing crushing and sieving in sequence, to obtain the agglomeration-like multi-element cathode material.

A third aspect of the present disclosure provides an agglomeration-like multi-element cathode material prepared by the preparation method according to the second aspect.

A fourth aspect of the present disclosure provides use of the agglomeration-like multi-element cathode material according to the first or third aspect or the preparation method according to the second aspect in a lithium-ion battery.

A fifth aspect of the present disclosure provides a lithium-ion battery. The lithium-ion battery contains the agglomeration-like multi-element cathode material according to the first or third aspect.

DETAILED DESCRIPTION

Figure 1:
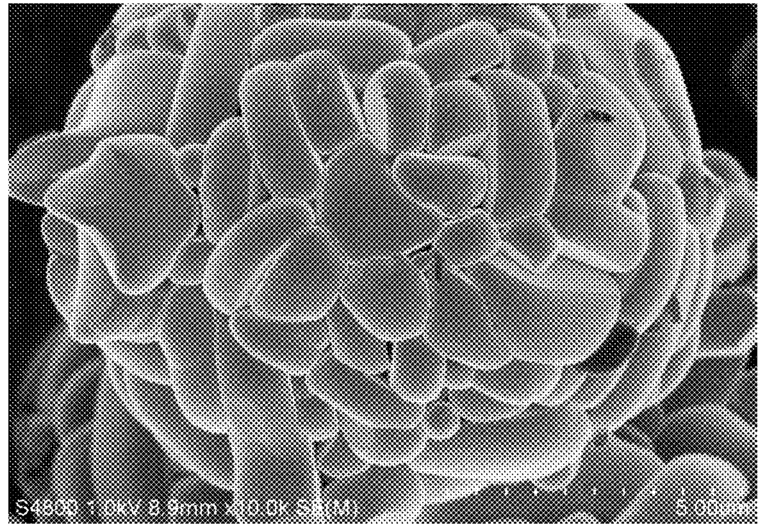
FIG. 1 is a Scanning Electron Microscope (SEM) image of an agglomeration-like multi-element cathode material prepared in Example 1 of the present disclosure.

End points and any values of a range disclosed herein are not limited to the exact ranges or values, and these ranges or values should be understood as including values approaching to these ranges or values. For numerical ranges, one or more new numerical ranges can be obtained by combining end point values of the respective ranges with each other, combining the end point values of the respective ranges and individual point values with each other and combining the individual point values with each other, and these numerical ranges should be regarded to be specifically disclosed herein.

In the present disclosure, unless clearly indicated, both terms “first” and “second” are only intended to distinguish each material or operation, rather than to represent a chronological order or play a role in limiting each material or operation. For example, “first” and “second” in “first cobalt source” and “second cobalt source” are only for a purpose of distinguishing to prove that they are not the same cobalt source; and “first” and “second” in “first high-temperature sintering” and “second high-temperature sintering” are only for a purpose of distinguishing to prove that they are not the same high-temperature sintering operation.

An object of the present disclosure is to overcome the problem that the existing ternary cathode materials cannot balance the energy density, rate capability and cycle stability.

A first aspect of the present disclosure provides an agglomeration-like multi-element cathode material. The multi-element cathode material has a structure represented by formula I:

$$Li_aNi_xCo_yMn_zM_bO_2 \quad \text{formula I;}$$

in formula I, $0.9 \leq a \leq 1.1$, $0.5 \leq x < 1$, $0 < y < 0.5$, $0 < z < 0.5$, and $0 \leq b < 0.05$; and M is at least one of V, Ta, Cr, La, Al, Ce, Er, Ho, Y, Mg, Sr, Ba, Ra, Zr, Fe, Ca, Zn, B, W, Nb, Cd, Pb, Si, Mo, Cu, Sr, and Ti.

The multi-element cathode material is secondary particles formed by agglomeration of primary particles. The primary particles are spherical or spherical-like and have an average particle size $D_S$ ranging from 0.9 μm to 2.4 μm. The secondary particles have an average particle size $D_L$ ranging from 5 μm to 15 μm. A value of $D_L/D_S$ ranging from 5 to 16.

According to some embodiments of the present disclosure, by controlling the sizes of the primary particles and the secondary particles of the agglomeration-like multi-element cathode material in combination with the value range of $D_L/D_S$, the formed multi-element cathode material can be agglomeration-like and have excellent performances of a single crystal material and an agglomerated material, and it can balance the energy density, rate capability, and cycle stability at the same time According to some embodiments of the present disclosure, preferably, the agglomeration-like multi-element cathode material has a spherical or spherical-like shape. The shape of the agglomeration-like multi-element cathode material is characterized by SEM.

According to some embodiments of the present disclosure, grain boundaries of the primary particles and surfaces of the secondary particles are rich in Co; a molar percentage of Co at centers of the primary particles is defined as K1, a molar percentage of Co at the grain boundaries of the primary particles is defined as K2, and a molar percentage of Co on the surfaces of the secondary particles is defined as K3, where K2−K1≥0.5%, and preferably, K2−K1≥1%, and K3−K1≥1.5%, and preferably, K3−K1≥3%. The “centers” of the primary particles refer to main parts other than the grain boundaries of the primary particles and the surfaces of the secondary particles, rather than true centers.

The adoption of the above-mentioned preferred embodiment is beneficial to the formation of uniform coating layers on the grain boundaries and the surfaces of the secondary particles. In this way, the migration ratio of lithium ions can be increased, and the electrolyte erosion can be inhibited, thereby improving the rate and cycle performances.

According to some embodiments of the present disclosure, preferably, in formula I, $1 \leq a \leq 1.1$, and $0.0005 \leq b \leq 0.01$.

According to some embodiments of the present disclosure, preferably, M is at least one of Mg, W, V, Ti, La, Nb, Si, Al and B.

According to some embodiments of the present disclosure, preferably, the average particle size $D_S$ of the primary particles ranges from 1.2 μm to 1.8 μm.

According to some embodiments of the present disclosure, preferably, the average particle size $D_L$ of the secondary particles ranges from 7 μm to 13 μm.

According to some embodiments of the present disclosure, preferably, the value of $D_L/D_S$ ranges from 7 to 12.

By adopting the above-mentioned preferred embodiment, $D_S$ is set to be in the range of 1.2 μm to 1.8 μm. If $D_S$ is greater than 1.8 μm, the primary particles are relatively larger, which may lead to a poor rate performance of the material, such that the product performances tend to be those of the single crystal material. If $D_S$ is smaller than 1.2 μm, the primary particles are relatively smaller, which may lead to poor structural stability and cycle performance, such that the product performances tend to be those of the agglomerated material. By adopting the above-mentioned preferred embodiment, $D_L$ is set to be in the range of 7 μm to 13 μm. If $D_L$ is greater than 13 μm, the secondary particles are relatively larger, and the migration rate of lithium ions is reduced, such that the rate performance deteriorates. If $D_L$ is smaller than 7 μm, the secondary particles are relatively smaller, and the compaction density is reduced, which may lead to the reduction in energy density and the deterioration in the cycle performance. By adopting the above-mentioned preferred embodiment, the value of $D_L/D_S$ is set to range from 7 to 12. If $D_L/D_S$ is greater than 12, there are more primary particles in the secondary particles, more grain boundaries may be formed, which may lower the pressure resistance of the material, such that the product performances tend to be those of the agglomerated material, and the electrode plates are easy to fracture during fabrication. If $D_L/D_S$ is smaller than 7, there are fewer primary particles in the secondary particles, and the formed grain boundaries are also fewer, such that the contact area of electrolyte and the cathode material is relatively smaller, thereby lowering the capacity of the material.

According to some embodiments of the present disclosure, the average particle size $D_S$ of the primary particles and the average particle size $D_L$, of the secondary particles are measured by SEM. The particle sizes can be measured by means of any graphical analysis software or manually, and data statistic results are obtained by means of any statistic software.

According to some embodiments of the present disclosure, the grain boundaries of the primary particles and the surfaces of the secondary particles are rich in Co. Preferably, with the same content of Co for coating in the agglomeration-like multi-element cathode material, a greater value of $D_L/D_S$ results in a lower content of Co at the grain boundaries of the primary particles and a higher content of Co on the surfaces of the secondary particles; and a smaller values $D_L/D_S$ leads to a higher content of Co at the grain boundaries of the primary particles and a lower content of Co on the surfaces of the secondary particles.

According to some embodiments of the present disclosure, preferably, the agglomeration-like multi-element cathode material has a Brunauer-Emmett-Teller (BET) specific surface area ranging from 0.1 $m^2/g$ to 0.4 $m^2/g$, and preferably, from 0.2 $m^2/g$ to 0.3 $m^2/g$. The BET specific surface area of the agglomeration-like multi-element cathode material is tested by a Tristar 3020 specific surface area analyzer from the Micromeritics Corporation.

According to some embodiments of the present disclosure, preferably, a value of a full width at half maximum $(FWHM)_{(104)}$ of a characteristic peak (104) of an X-ray diffraction (XRD) test of the agglomeration-like multi-element cathode material ranges from 0.19 to 0.23, and preferably, from 0.2 to 0.22. The $FWHM_{(104)}$ of the agglomeration-like multi-element cathode material is tested by a Smart Lab 9KW X-ray diffractometer from the Rigaku Corporation. The $FWHM_{(104)}$ specifically refers to a full width at half maximum of a crystal surface (104) of the agglomeration-like multi-element cathode material. The above-mentioned value range indicates that the performance characterized by the XRD of the agglomeration-like multi-element cathode material has the properties of single crystal.

According to some embodiments of the present disclosure, preferably, the agglomeration-like multi-element cathode material has $D_{50}$ ranging from 5 μm to 15 μm, and preferably, from 7 μm to 13 μm. $D_{50}$ of the agglomeration-like multi-element cathode material is measured by a laser particle size analyzer.

A second aspect of the present disclosure provides a preparation method for an agglomeration-like multi-element cathode material. The preparation method includes:

(1) mixing a nickel source, a first cobalt source, a manganese source, a complexing agent, and a precipitant for co-precipitation reaction to obtain slurry; and performing aging, filter-pressing, washing, and drying on the slurry in sequence, to obtain a nickel cobalt manganese ternary precursor;

(2) mixing the nickel cobalt manganese ternary precursor and a lithium source for first high-temperature sintering, and performing crushing and sieving in sequence, to obtain an agglomeration-like cathode material in-process product; and (3) mixing the agglomeration-like cathode material in-process product and a second cobalt source for second high-temperature sintering, and performing crushing and sieving in sequence, to obtain the agglomeration-like multi-element cathode material.

It should be noted that, in the present disclosure, Co introduced by the first cobalt source is denoted by $Co^1$, and Co introduced by the second cobalt source is denoted by $Co^2$, for distinguishing.

According to some embodiments of the present disclosure, in step (1), a pH value of the co-precipitation reaction ranges from 10 to 13. If the pH value of the co-precipitation reaction is high, the obtained primary fibers are thin, and the precursor has a great BET and is easy to fuse during subsequent sintering, thereby likely forming a cathode material with larger primary particles. On the contrary, if the pH value of the co-precipitation reaction is low, the obtained primary fibers are thick, the precursor has a small BET and is not easy to fuse during subsequent sintering, thereby likely forming a cathode material with smaller primary particles.

According to some embodiments of the present disclosure, preferably, in step (1), the nickel cobalt manganese ternary precursor has a BET specific surface area ranging from 7 $m^2/g$ to 14 $m^2/g$.

According to some embodiments of the present disclosure, preferably, in step (1), conditions of the co-precipitation reaction further include: a temperature ranging from 40° C. to 80° C., a duration ranging from 5 hours to 40 hours, and a rotating speed ranging from 300 rpm to 900 rpm.

According to some embodiments of the present disclosure, preferably, in step (1), the nickel cobalt manganese ternary precursor has $D_{50}$ ranging from 5 μm to 15 μm, and preferably, from 7 μm to 13 μm.

According to some embodiments of the present disclosure, preferably, in step (1), the nickel source, the first cobalt source and the manganese source are each independently selected from at least one of sulfate, chlorate, nitrate and acetate. For example, the nickel source can be selected from at least one of nickel sulfate, nickel chloride, nickel nitrate, and nickel acetate; the first cobalt source can be selected from at least one of cobalt sulfate, cobalt chloride, cobalt nitrate, and cobalt acetate; and the manganese source can be selected from at least one of manganese sulfate, manganese chloride, manganese nitrate, and manganese acetate.

According to some embodiments of the present disclosure, preferably, in step (1), the step of mixing includes: a mixed saline solution containing the nickel source, the first cobalt source and the manganese source, the complexing agent and the precipitant are introduced to a reaction kettle in parallel flows. More preferably, the concentration of the mixed saline solution ranges from 2 mol/L to 3 mol/L. The mixed saline solution can be purchased or prepared according to a conventional method in the art, which is not specifically limited herein. Further preferably, said mixing is performed under the protection of an inert gas.

According to some embodiments of the present disclosure, in step (1), the precipitant can be well-known in the art and suitable for preparing the nickel cobalt manganese ternary precursor, which is not specifically limited herein, as long as the inventive purpose of the present disclosure can be achieved to a certain extent. Preferably, the precipitant is selected from sodium hydroxide and/or potassium hydroxide. More preferably, the precipitant is provided in the form of an aqueous solution of precipitant, in which the concentration of the aqueous solution of precipitant ranges from 5 mol/L to 10 mol/L.

According to some embodiments of the present disclosure, in step (1), the complexing agent can be that well-known in the art and suitable for preparing the nickel cobalt manganese ternary precursor, which is not specifically limited herein, as long as the inventive purpose of the present disclosure can be achieved to a certain extent. Preferably, the complexing agent is selected from at least one of ammonia, ethylenediaminetetraacetic acid disodium salt, ammonium nitrate, ammonium chloride, and ammonium sulfate. More preferably, the complexing agent is provided in the form of an aqueous solution of complexing agent, in which the mass fraction of the aqueous solution of complexing agent ranges from 20% to 30%.

According to some embodiments of the present disclosure, in step (1), the dosages of the precipitant and the complexing agent are not specifically limited, as long as the co-precipitation reaction can satisfy the growth requirements of the precursor.

According to some embodiments of the present disclosure, in step (1), said aging, said filter-pressing, said washing, and said drying can be performed by using conventional methods well-known by those skilled in the art, and they are not specifically limited herein.

According to some embodiments of the present disclosure, preferably, in step (2), a temperature of the first high-temperature sintering is defined as T, a range of T satisfying formula II:

$$\frac{1700}{lg(C_{Ni}*100)}+50*lgD_L-100\le T\le\frac{1700}{lg(C_{Ni}*100)}+50*lgD_L; \quad \text{formula II}$$

preferably, the range of T satisfying formula III:

$$\frac{1700}{lg(C_{Ni}*100)}+25*lgD_L-50\le T\le\frac{1700}{lg(C_{Ni}*100)}+25*lgD_L; \quad \text{formula III}$$

where $C_{Ni}$ is a molar percentage of element Ni in a mixture consisting of the nickel source, the first cobalt source, and the manganese source; and the definition and value range of $D_L$ can be selected with reference to the preceding text, which is not repeated herein.

According to some embodiments of the present disclosure, preferably, in step (2), if the temperature of the first high-temperature sintering is high, $D_L/D_S$ is relatively small; and if the temperature of the first high-temperature sintering is low, $D_L/D_S$ is relatively great.

According to some embodiments of the present disclosure, preferably, in step (2), the conditions of the first high-temperature sintering include: a duration ranging from 10 hours 30 hours, and the sintering atmosphere being provided by an oxygen-containing gas. Preferably, a content of oxygen in the oxygen-containing gas ranges from 1 vol % to 100 vol %.

According to some embodiments of the present disclosure, preferably, in step (2), the agglomeration-like cathode material in-process product has $D_{50}$ ranging from 5 μm to 15 μm, and preferably, from 7 μm to 13 μm.

According to some embodiments of the present disclosure, $D_{50}$ of the nickel cobalt manganese ternary precursor and $D_{50}$ of the agglomeration-like cathode material in-process product are tested by a laser particle size analyzer.

According to some embodiments of the present disclosure, preferably, in step (2), based on a stoichiometric ratio, a dosage of the lithium source satisfies: $0.9\le[n(Li)]/[n(Ni)+n(Co^1)+n(Mn)]\le1.1$, and preferably, $$1.02\le[n(\text{Li})]/[n(\text{Ni})+n(\text{Co}^1)+n(\text{Mn})]\le1.06.$$

According to some embodiments of the present disclosure, in step (2), the lithium source can be that well-known in the art and suitable for preparing the cathode material, which is not specifically limited herein, as long as the inventive purpose of the present disclosure can be achieved to a certain extent. Preferably, the lithium source is selected from at least one of lithium carbonate, lithium hydroxide, lithium oxide, and lithium acetate.

According to some embodiments of the present disclosure, in step (2), said crushing and said sieving can be performed by using conventional methods well-known by those skilled in the art, which is not specifically limited herein, as long as the agglomeration-like cathode material in-process product with $D_{50}$ meeting the above-mentioned requirements can be obtained.

According to some embodiments of the present disclosure, preferably, in step (3), conditions of the second high-temperature sintering include: a temperature ranging from 200° C. to 1,000° C., a duration ranging from 5 hours to 20 hours, and a sintering atmosphere being provided by oxygen-containing gas. Preferably, a content of oxygen in the oxygen-containing gas ranges from 1 vol % to 100 vol %.

According to some embodiments of the present disclosure, preferably, in step (3), the second cobalt source is selected from at least one of cobalt oxide, cobalt (III) hydroxide, cobalt oxyhydroxide, cobalt fluoride, cobalt (II) hydroxide, cobalt tetroxide, cobalt carbonate and cobalt acetate, and preferably, at least one of cobalt oxide, cobalt (III) hydroxide, cobalt tetroxide, cobalt oxyhydroxide, and cobalt (II) hydroxide. The adoption of the above-mentioned preferred embodiment is beneficial to the achievement of uniform coating and control of residual alkali on surfaces.

According to some embodiments of the present disclosure, preferably, in step (3), based on a stoichiometric ratio, a dosage of the second cobalt source satisfies: $0.005\le[n(Co^2)]/[n(Ni)+n(Co^1)+n(Mn)]\le0.1$, and preferably, $$0.01\le[n(\text{Co}^2)]/[n(\text{Ni})+n(\text{Co}^1)+n(\text{Mn})]\le0.06.$$

According to some embodiments of the present disclosure, the dosages of the first cobalt source and the second cobalt source enable the total content of Co in the agglomeration-like multi-element cathode material to satisfy: n(Ni):n(Co):n(Mn)=x:y:z, where $n(Co)=n(Co^1)+n(Co^2)$. The values of x, y and z can be defined and selected with reference to the preceding text, which is not repeated herein.

According to some embodiments of the present disclosure, preferably, in step (3), $D_{50}$ of the agglomeration-like cathode material ranges from 5 μm to 15 μm, and preferably, from 7 μm to 13 μm.

According to some embodiments of the present disclosure, said crushing and said sieving can be performed by using conventional methods well-known by those skilled in the art, which is not specifically limited herein, as long as the agglomeration-like cathode material in-process product with $D_{50}$ meeting the above-mentioned requirements can be obtained.

According to some embodiments of the present disclosure, preferably, an additive is further mixed in step (1).

According to some embodiments of the present disclosure, preferably, a dopant is further mixed in step (2).

According to some embodiments of the present disclosure, preferably, a coating agent is further mixed in step (3).

According to some embodiments of the present disclosure, the additive, the dopant, and the coating agent are the same or different and are each independently selected from an M-containing compound, and preferably, the additive, the dopant, and the coating agent are each independently selected from at least one of oxide, fluoride, hydroxide, oxyhydroxide, carbonate, nitrate, sulfate, and acetate that contain M.

According to some embodiments of the present disclosure, preferably, the dopant is selected from at least one of MgO, $WO_3$, $TiO_2$, $Nb_2O_5$, and $Al_2O_3$.

According to some embodiments of the present disclosure, preferably, the coating agent is selected from at least one of $V_2O_5$, $La_2O_3$, $SiO_2$, and $B_2O_3$.

According to some embodiments of the present disclosure, preferably, a dosage of the additive satisfies: a molar fraction of the additive calculated based on the element M in the total molar weight of Ni, Co and Mn ranges from 0.01% to 3%.

According to some embodiments of the present disclosure, preferably, a dosage of the dopant satisfies: a molar fraction of the dopant calculated based on the element M in the total molar weight of Ni, Co and Mn ranges from 0.01% to 3%.

According to some embodiments of the present disclosure, preferably, a dosage of the coating agent satisfies: a molar fraction of the coating agent calculated based on the element M in the total molar weight of Ni, Co and Mn ranges from 0.01% to 3%.

According to some embodiments of the present disclosure, the total dosage of the additive, the dopant and the coating agent enable the obtained multi-element cathode material to satisfy n(Ni):n(Co):n(Mn):n(M)=x:y:z:b, where values of x, y, z and b can be defined and selected with reference to the preceding text, which is not repeated herein.

According to some embodiments of the present disclosure, the agglomeration-like multi-element cathode material prepared by the preparation method has a structure represented by formula I:

$$Li_aNi_xCo_yMn_zM_bO_2 \quad \text{formula I;}$$

in formula I, $0.9 \le a \le 1.1$, $0.5 \le x < 1$, $0 < y < 0.5$, $0 < z < 0.5$, and $0 \le b < 0.05$; and M is at least one of V, Ta, Cr, La, Al, Ce, Er, Ho, Y, Mg, Sr, Ba, Ra, Zr, Fe, Ca, Zn, B, W, Nb, Cd, Pb, Si, Mo, Cu, Sr, and Ti;

the multi-element cathode material is secondary particles formed by agglomeration of primary particles; the primary particles are spherical or spherical-like and have the average particle size $D_S$ ranging from 0.9 μm to 2.4 μm; the secondary particles have the average particle size $D_L$ ranging from 5 μm to 15 μm; and the value of $D_L/D_S$ ranges from 5 to 16.

A third aspect of the present disclosure provides an agglomeration-like multi-element cathode material prepared by the preparation method according to the second aspect.

A fourth aspect of the present disclosure provides use of the agglomeration-like multi-element cathode material according to the first or third aspect or the preparation method according to the second aspect in a lithium-ion battery.

A fifth aspect of the present disclosure provides a lithium-ion battery. The lithium-ion battery contains the agglomeration-like multi-element cathode material according to the first or third aspect.

By means of the above-mentioned technical solutions, the present disclosure has the following advantages.

1. The primary particles of the agglomerated ternary cathode materials known in the related art generally have a particle size ranging from 0.2 to 0.6 μm. The agglomeration-like multi-element cathode material provided by the present disclosure is secondary particles formed by agglomeration of primary particles. The primary particles are spherical or spherical-like and tighter in stacking, and have strong binding force therebetween and high compaction density. The secondary particles formed by the primary particles are also spherical or spherical-like. The shape characteristics of the primary particles and the secondary particles in the present disclosure are beneficial to the improvement of energy densities and cycle performances of batteries. The primary particles have an average particle size $D_S$ ranging from 0.9 to 2.4 μm, which is closer to a size of a single crystal ternary cathode material.

The existing agglomerated ternary cathode materials are prone to fracture during the fabrication of electrode plates, and due to the expansion or shrinkage of the particles, the primary particles are easy to separate during cycle, which destroys the structure of the material and leads to the decrease of electric performances. In contrast, the agglomeration-like multi-element cathode material provided by the present disclosure can remedy the defects of the agglomerated material and has higher compressive strength, and even when fracture occurs and the primary particles are separated from each other during cycle, the performances of the separated primary particles are still similar to those of the single crystal material, which can ensure the stability of the electric performance of the cathode material during cycle.

2. In the agglomeration-like multi-element cathode material provided by the present disclosure, the average particle size $D_L$ of the secondary particles ranges from 5 to 15 μm, which is close to that of the agglomerated material and greater than that of the primary particles of the single crystal material. After the agglomeration-like multi-element cathode material is prepared into electrode plates, compared with the single crystal material, the particles thereof are bond tighter, the electrode plates have better rate capability and require less conductive agent and binder, which is beneficial to the increase of a proportion of active substances; and the electrode plates have higher the compaction density, which can increase the energy density of the batteries.

3. In the agglomeration-like multi-element cathode material provided by the present disclosure, grain boundaries of the primary particles and surfaces of the secondary particles are rich in Co. A molar percentage of Co at centers of the primary particles is defined as K1, a molar percentage of Co at the grain boundaries of the primary particles is defined as K2, and a molar percentage of Co on the surfaces of the secondary particles is defined as K3, where: $K-K1 \ge 0.5\%$, and $K3-K1 \ge 1.5\%$. Due to the greater primary particles of the multi-element cathode material provided by the present disclosure, gaps between the grain boundaries of the primary particles are larger. After high-temperature sintering is performed on the agglomeration-like cathode material in-process product coated with a cobalt-containing compound with strong ductility, element Co can not only coat the surfaces of the secondary particles, but can enter the interiors of the secondary particles alone the grain boundaries of the primary particles and can thus be enriched on interfaces of the primary particles. In this way, the purpose of simultaneously coating element Co on the primary particles and the secondary particles is achieved. In a process that the obtained multi-element cathode material is used to prepare the electrode plates and during cycling, if the secondary particles are crushed or the electrolyte reaches the surfaces of the primary particles by passing through the grain boundaries, the exposed surfaces of the primary particles still have coating layers for protection. Thus, the structural stability of the material can be improved, and the erosion of the electrolyte can be inhibited, thereby improving the cycle stability and safety.

The present disclosure is described below in detail with embodiments. In the following examples and comparative examples, all the raw materials are commercially available, unless otherwise specifically indicated.

The room temperature refers to 25±2° C., unless otherwise specifically indicated.

In the following examples and comparative examples, related parameters are tested by using the following methods:

(1) Morphology test: tested with scanning electron microscope S-4800, HITACHI, Japan (2) BET test: tested with Tristar 3020 specific surface area analyzer from the Micromeritics Corporation.

(3) XRD test: tested with diffractometer Smart Lab 9KW X-ray from Rigaku Corporation;

(4) $D_{50}$ particle size test: tested with laser particle size analyzer Hydro 2000 mu from Marvern Corporation.

(5) electrochemical performance test: in the following examples and comparative examples, the electrochemical performance of the multi-element cathode material was tested by adopting a 2025 button battery.

A preparation process of the 2025 button battery is specifically described as follows.

Preparation of electrode plate: the multi-element cathode material, acetylene black, and polyvinylidene fluoride (PVDF) at a mass ratio of 95:3:2 were sufficiently mixed with an appropriate amount of N-methylpyrrolidone (NMP) to form uniform slurry; the slurry was coated on an aluminum foil, dried at 120° C. for 12 h, and the foil was punched at a pressure of 100 MPa to form positive electrode plates with a diameter of 12 mm and a thickness of 120 μm. A loading capacity of the multi-element cathode material was 15 to 16 mg/cm$^2$.

Battery assembly: in an argon-filled gas glove box in which the water content and the oxygen content were both lower than 5 ppm, the positive electrode plate, a separator, a negative electrode plate, and electrolyte were assembled to form the 2025 button battery, and then, the 2025 button battery was left to stand for 6 h. The negative electrode plate was a lithium metal sheet with a diameter of 17 mm and a thickness of 1 mm. The separator was a porous polyethylene membrane (Celgard 2325) with a thickness of 25 μm. The electrolyte was a mixture of equivalent amounts of ethylene carbonate (EC) and diethyl carbonate (DEC), the mixture containing LiPF6 with the concentration of 1 mol/L.

Electrochemical performance test: in the following examples and comparative examples, the electrochemical performances of the button battery were tested using a Neware battery testing system (NEWARE TECHNOLOGY LIMITED, Shenzhen), which a charge/discharge current density at 0.1C of 200 mA/g.

A charge/discharge voltage range was controlled within 3.0 V to 4.3 V. At the room temperature, a charge/discharge test was performed on the button battery at 0.1C to evaluate the first charge/discharge specific capacity and first charge/discharge efficiency of the multi-element cathode material.

Cycle performance test: a charge/discharge voltage range was controlled within 3.0 V to 4.3 V; at a constant temperature of 45° C., the button battery was charged and discharged for 2 cycles at 0.1C, and then charged and discharged for 80 cycles at 1C to evaluate the high-temperature cycle capacity retention rate of the cathode material.

Rate capability test: a charge/discharge voltage range was controlled within 3.0 V to 4.3 V; at the room temperature, the button battery was charged and discharged for 2 cycles at 0.1C, and then charged and discharged for 1 cycle at 0.2C, 0.33C, 0.5C and 1C, respectively; and the rate capability of the multi-element cathode material was evaluated based a ratio of the first discharge specific capacity at 0.1C to the discharge specific capacity at 1C. The first discharge specific capacity at 0.1C was the discharge specific capacity of the button battery in the first cycle, and the discharge specific capacity at 1C was the discharge specific capacity of the button battery in the sixth cycle.

Example 1

(1) A nickel source, a first cobalt source, a manganese source, a complexing agent, and a precipitant were mixed for co-precipitation reaction to obtain slurry; and then, the slurry was subjected to aging, filter-pressing, washing, and drying in sequence, to obtain a nickel cobalt manganese ternary precursor. The nickel source was nickel sulfate; the first cobalt source was cobalt sulfate; and the manganese source was manganese sulfate. The complexing agent was provided in the form of an aqueous solution of complexing agent, which was ammonia with a mass fraction of 25%. The precipitant was formed in the form of an aqueous solution of precipitant, which was an aqueous solution of NaOH with a concentration of 8 mol/L. Said mixing was specifically performed by: under the protection of nitrogen, introducing an aqueous solution containing the above-mentioned nickel source, first cobalt source and manganese source, the aqueous solution of complexing agent, and the aqueous solution of precipitant into a reaction kettle in parallel flows, in which a molar ratio of $Ni:Co^1:Mn$ can refer to Table 1. The conditions of the co-precipitation reaction included: the temperature of 60° C., the duration of 20 h, and the rotating speed of 800 rpm; and the pH value of the co-precipitation reaction can refer to Table 1. The chemical formula, BET and $D_{50}$ of the obtained nickel cobalt manganese ternary precursor can refer to Table 2.

(2) The nickel cobalt manganese ternary precursor, a lithium source, and a dopant were mixed for first high-temperature sintering, and crushing and sieving were performed in sequence, to obtain an agglomeration-like cathode material in-process product. The lithium source was LiOH. The type of the dopant and a molar ratio of the dosages of all the raw materials can refer to Table 1. The conditions of the first high-temperature sintering included: the duration of 18 h, and the sintering atmosphere provided by oxygen; the temperature of the first high-temperature sintering referring to Table 1. Before said crushing and said sieving were performed, a product obtained by the first high-temperature sintering was naturally cooled to the room temperature. The chemical formula composition and $D_{50}$ of the obtained agglomeration-like cathode material in-process product can refer to Table 2.

(3) The agglomeration-like cathode material in-process product and a second cobalt source were mixed for second high-temperature sintering, and crushing and sieving were performed in sequence, to obtain the agglomeration-like multi-element cathode material. The type of the second cobalt source and a molar ratio of the dosages of all the raw materials can refer to Table 1. The conditions of the second high-temperature sintering included: the temperature of 720° C., the duration of 10 h, and the sintering atmosphere provided by oxygen. Before said crushing and said sieving were performed, a product obtained by the second high-temperature sintering was naturally cooled to the room temperature. The chemical formula composition and $D_{50}$ of the obtained agglomeration-like cathode material can refer to Table 2.

Example 2 to Example 5

The agglomeration-like multi-element cathode materials of Example 2 to Example 5 were prepared by using the method in Example 1 except the differences in the raw materials and process parameters, which are specifically shown in Table 1. The chemical formula compositions and test data of characteristic parameters of the respective products can refer to Table 2.

Comparative Example 1

The cathode material of Comparative Example 1 was prepared according to the method in Example 1. Comparative Example 1 merely differed from Example 1 in that: in step (1), the pH value of the co-precipitation reaction was 11.2; and in step (2), the temperature of the first high-temperature sintering was 790° C. The chemical formula compositions and test data of characteristic parameters of the product can refer to Table 2.

Comparative Example 2

The cathode material of Comparative Example 2 was prepared according to the method in Example 1. Comparative Example 2 merely differed from Example 1 in that: in step (1), the pH value of the co-precipitation reaction was 13.2; and in step (2), the temperature of the first high-temperature sintering was 970° C. The chemical formula compositions and test data of characteristic parameters of the product can refer to Table 2.

Comparative Example 3

The cathode material of Comparative Example 3 was prepared according to the method in Example 1. Comparative Example 3 merely differed from Example 1 in that step (3) was omitted, i.e., the agglomeration-like cathode material in-process product was directly used as the cathode material. The chemical formula compositions and test data of characteristic parameters of the product can refer to Table 2.

TABLE 1

| Items | Example 1 | Example 2 | Example 3 | Example 4 | Example 5 |
|---|---|---|---|---|---|
| $Ni:Co^1:Mn$ | 80:10:10 | 80:10:10 | 80:10:10 | 80:10:10 | 95:3:2 |
| pH value of co-precipitation reaction | 12.3 | 11.5 | 12.9 | 12.3 | 11.8 |
| $Li/(Ni + Co^1 + Mn)$ | 1.05 | 1.05 | 1.05 | 1.04 | 1.06 |
| Type of dopant | MgO | $WO_3$ | $TiO_2$ | $Nb_2O_5$ | $Al_2O_3$ |
| Dosage of dopant | $Mg/(Ni + Co^1 + Mn) = 0.001:1$ | $W/(Ni + Co^1 + Mn) = 0.0005:1$ | $Ti/(Ni + Co^1 + Mn) = 0.002:1$ | $Nb/(Ni + Co^1 + Mn) = 0.003:1$ | $Al/(Ni + Co^1 + Mn) = 0.0015:1$ |
| Temperature of first high-temperature sintering | 880° C. | 850° C. | 920° C. | 880° C. | 840° C. |
| Type of second cobalt source | cobalt (III) hydroxide | cobalt tetroxide | cobalt oxide | cobalt (III) hydroxide | cobalt (II) hydroxide |
| $Co^2/(Ni + Co^1 + Mn)$ | 0.03 | 0.03 | 0.03 | 0.005 | 0.04 |
| Type of coating agent | / | $V_2O_5$ | $La_2O_3$ | $SiO_2$ | $B_2O_3$ |
| Dosage of coating agent | / | $V/(Ni + Co^1 + Mn) = 0.0001:1$ | $La/(Ni + Co^1 + Mn) = 0.0003:1$ | $Si/(Ni + Co^1 + Mn) = 0.002:1$ | $B/(Ni + Co^1 + Mn) = 0.001:1$ |
| Temperature of second high-temperature sintering | 720 | 700 | 740 | 720 | 680 |

Note:
the proportion of each element was calculated based on a molar ratio.

Test Examples (1) Morphology Test

Figure 2:
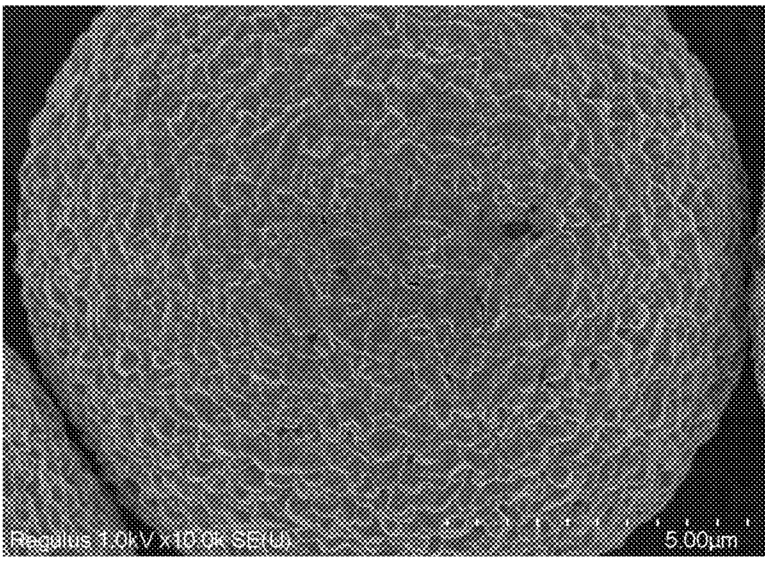
FIG. 2 is an SEM image of a cathode material prepared in Comparative Example 1 of the present disclosure.
Figure 3:
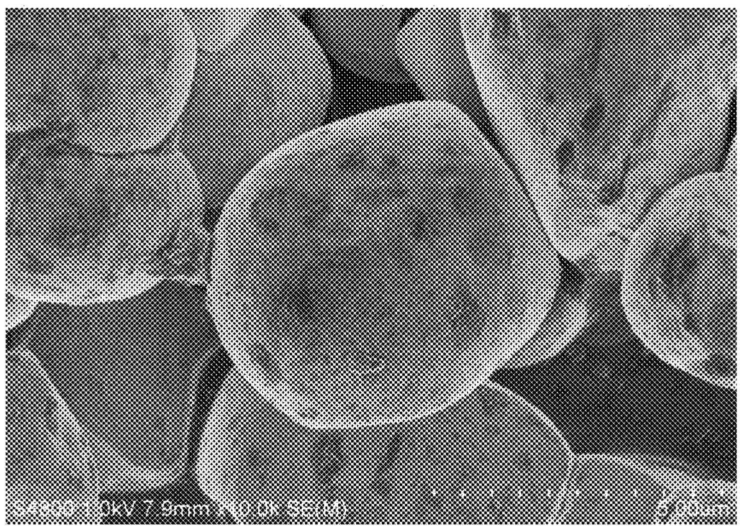
FIG. 3 is an SEM image of a cathode material prepared in Comparative Example 2 of the present disclosure.
Figure 4:
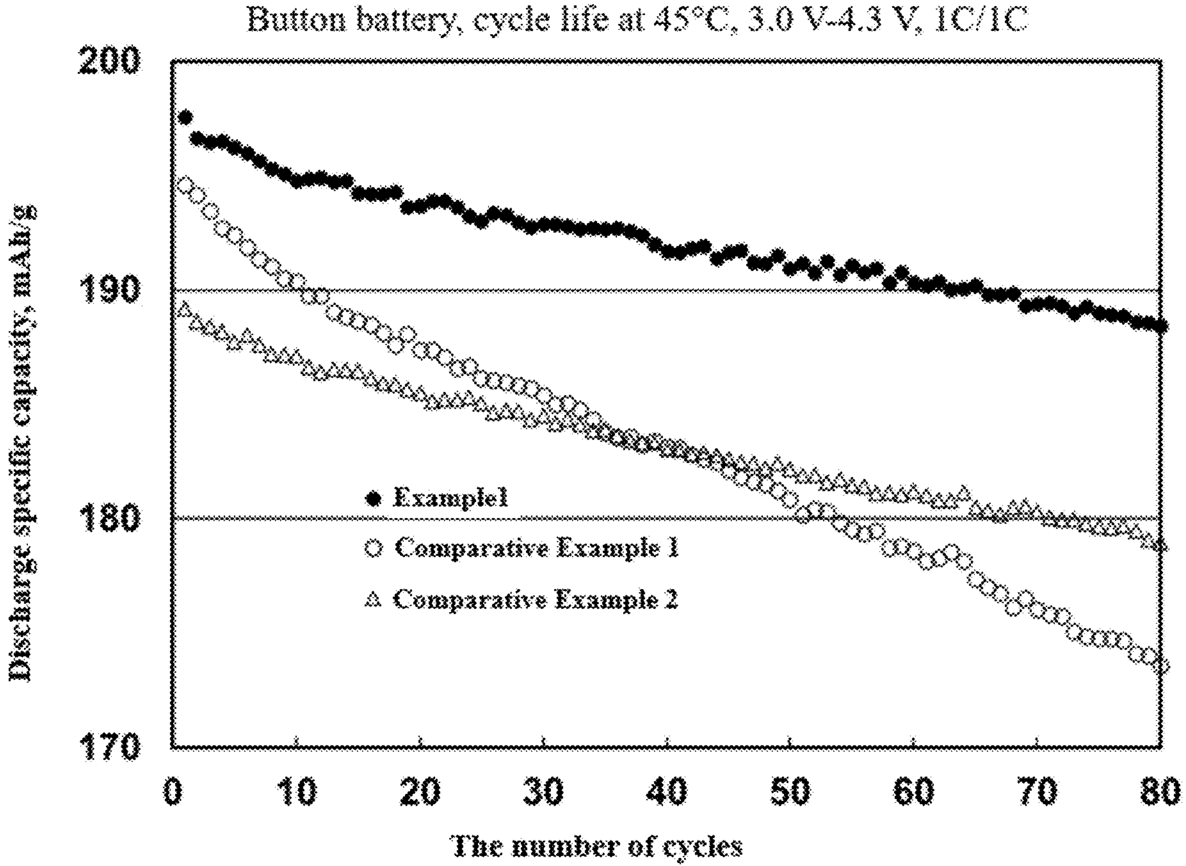
FIG. 4 is a diagram of cycle performances of the cathode materials prepared in Example 1 of the present disclosure, Comparative Example 1 and Comparative Example 2 at a rate of 1C, with a test temperature of 45° C., and with a voltage ranging from 3.0 V to 4.3 V.

In the present disclosure, scanning electron microscope (SEM) images of the cathode materials prepared in the above-mentioned examples and comparative examples were tested. FIG. 1 is an SEM image of an agglomeration-like multi-element cathode material prepared in Example 1 of the present disclosure; FIG. 2 is an SEM image of a cathode material prepared in Comparative Example 1 of the present disclosure; and FIG. 3 is an SEM image of a cathode material prepared in Comparative Example 2 of the present disclosure. The images reveal that: the primary particles in the cathode material obtained in Example 1 are greater than those of the agglomerated material in Comparative Example 1 and smaller than those of the single crystal material in Comparative Example 2; and the cathode material obtained in Example 1 has relatively large gaps between the primary particles and round and spherical secondary particles.

(2) Physical Property Test

In the present disclosure, the cathode material prepared in the above-mentioned examples and comparative examples were tested in terms of $D_{50}$, BET, XRD (full width at half maximum $FWHM_{(104)}$), the average particle size $D_S$ of the primary particles and the average particle size $D_L$ of the secondary particles. The specific test results are listed in Table 2.

TABLE 2

| Items | | Example 1 | Comparative Example 1 |
|---|---|---|---|
| Precursor * | Chemical formula composition | $Ni_{0.8}Co_{0.1}Mn_{0.1}(OH)_2$ | $Ni_{0.8}Co_{0.1}Mn_{0.1}(OH)_2$ |
| | BET/($m^2$/g) | 10.1 | 7.5 |
| | $D_{50}$/(μm) | 10.2 | 10.2 |
| In-process product ** | Chemical formula composition | $Li_{1.05}Ni_{0.8}Co_{0.1}Mn_{0.1}Mg_{0.001}O_2$ | $Li_{1.05}Ni_{0.8}Co_{0.1}Mn_{0.1}Mg_{0.001}O_2$ |
| | $D_{50}$/(μm) | 10 | 10.1 |
| Cathode material *** | Chemical formula composition | $Li_{1.05}Ni_{0.77}Co_{0.13}Mn_{0.1}Mg_{0.001}O_2$ | $Li_{1.05}Ni_{0.77}Co_{0.13}Mn_{0.10}Mg_{0.001}O_2$ |
| | BET/($m^2$/g) | 0.23 | 0.17 |
| | $D_{50}$/(μm) | 10.1 | 10.1 |
| | $FWHM_{(104)}$ | 0.212 | 0.244 |
| | $D_S$/(μm) | 1.32 | 0.36 |
| | $D_L$/(μm) | 10.3 | 10.2 |
| | $D_L/D_S$ | 7.8 | 28.3 |

| Items | | Comparative Example 2 | Comparative Example 3 |
|---|---|---|---|
| Precursor * | Chemical formula composition | $Ni_{0.8}Co_{0.1}Mn_{0.1}(OH)_2$ | $Ni_{0.8}Co_{0.1}Mn_{0.1}(OH)_2$ |
| | BET/($m^2$/g) | 14.5 | 10.1 |
| | $D_{50}$/(μm) | 10.2 | 10.2 |
| In-process product ** | Chemical formula composition | $Li_{1.05}Ni_{0.8}Co_{0.1}Mn_{0.1}Mg_{0.001}O_2$ | $Li_{1.05}Ni_{0.8}Co_{0.1}Mn_{0.1}Mg_{0.001}O_2$ |
| | $D_{50}$/(μm) | 9.9 | 10 |
| Cathode material *** | Chemical formula composition | $Li_{1.05}Ni_{0.77}Co_{0.13}Mn_{0.10}Mg_{0.001}O_2$ | $Li_{1.05}Ni_{0.8}Co_{0.1}Mn_{0.1}Mg_{0.001}O_2$ |
| | BET/($m^2$/g) | 0.19 | 0.19 |
| | $D_{50}$/(μm) | 6.4 | 10 |
| | $FWHM_{(104)}$ | 0.197 | 0.211 |
| | $D_S$/(μm) | 4.42 | 1.32 |
| | $D_L$/(μm) | / | 10.3 |
| | $D_L/D_S$ | / | 7.8 |

Note:
precursor * indicates the nickel cobalt manganese ternary precursor; in-process product  indicates the agglomeration-like cathode material in-process product; and cathode material * indicates the agglomeration-like cathode material prepared in the examples or the cathode material prepared in the comparative examples.

| Items | | Example 2 | Example 3 |
|---|---|---|---|
| Precursor * | Chemical formula composition | $Ni_{0.8}Co_{0.1}Mn_{0.1}(OH)_2$ | $Ni_{0.8}Co_{0.1}Mn_{0.1}(OH)_2$ |
| | BET/($m^2$/g) | 8.2 | 13.2 |
| | $D_{50}$/(μm) | 10.2 | 10.2 |
| In-process product ** | Chemical formula composition | $Li_{1.05}Ni_{0.8}Co_{0.1}Mn_{0.1}W_{0.0005}O_2$ | $Li_{1.05}Ni_{0.8}Co_{0.1}Mn_{0.1}Ti_{0.002}O_2$ |
| | $D_{50}$/(μm) | 9.9 | 10.1 |
| Cathode material *** | Chemical formula composition | $Li_{1.05}Ni_{0.77}Co_{0.13}Mn_{0.1}W_{0.0005}V_{0.0001}O_2$ | $Li_{1.05}Ni_{0.77}Co_{0.13}Mn_{0.1}Ti_{0.002}La_{0.0003}O_2$ |
| | BET/($m^2$/g) | 0.17 | 0.26 |
| | $D_{50}$/(μm) | 10 | 10.2 |
| | $FWHM_{(104)}$ | 0.224 | 0.202 |
| | $D_S$/(μm) | 0.91 | 2.02 |
| | $D_L$/(μm) | 10.2 | 10.5 |
| | $D_L/D_S$ | 11.2 | 5.2 |

TABLE 2-continued

| Items | | Example 4 | Example 5 |
|---|---|---|---|
| Precursor * | Chemical formula composition | $Ni_{0.8}Co_{0.1}Mn_{0.1}(OH)_2$ | $Ni_{0.95}Co_{0.03}Mn_{0.02}(OH)_2$ |
| | BET/($m^2$/g) | 10.1 | 9.6 |
| | $D_{50}$/(μm) | 10.2 | 10.1 |
| In-process product ** | Chemical formula composition | $Li_{1.05}Ni_{0.8}Co_{0.1}Mn_{0.1}Nb_{0.003}O_2$ | $Li_{1.05}Ni_{0.8}Co_{0.1}Mn_{0.1}Al_{0.0015}O_2$ |
| | $D_{50}$/(μm) | 10 | 9.9 |
| Cathode material *** | Chemical formula composition | $Li_{1.05}Ni_{0.795}Co_{0.105}Mn_{0.1}Nb_{0.003}Si_{0.002}O_2$ | $Li_{1.05}Ni_{0.91}Co_{0.07}Mn_{0.02}Al_{0.0015}B_{0.001}O_2$ |
| | BET/($m^2$/g) | 0.22 | 0.24 |
| | $D_{50}$/(μm) | 10 | 10 |
| | $FWHM_{(104)}$ | 0.212 | 0.213 |
| | $D_S$/(μm) | 1.32 | 1.45 |
| | $D_L$/(μm) | 10.1 | 10.3 |
| | $D_L/D_S$ | 7.7 | 7.1 |

Note:
precursor * indicated the nickel cobalt manganese ternary precursor; in-process product  indicates the agglomeration-like cathode material in-process product; and cathode material * indicated the agglomeration-like cathode material.

It can be seen from results in Table 1 and Table 2 that, during the preparation of the agglomeration-like cathode material, the $FWHM_{(104)}$ of the cathode material became smaller once the temperature of sintering was raised; the average particle size of the primary particles was increased once the temperature was raised; and when reaching a certain size, the primary particles separated from each other to form independent particles.

The cathode material in Comparative Example 1 has a relatively great value of $D_L/D_S$ and is the agglomerated material, and the cathode material in Comparative Example 2 is the single crystal material. The $FWHM_{(104)}$ of the agglomeration-like cathode material of the present disclosure is between those of the single crystal material and the agglomerated material and is closer to that of the single crystal material.

(3) Composition Test

In the present disclosure, for the cathode materials prepared in the above-mentioned examples and comparative examples, compositions of Ni, Co and Mn in the centers and grain boundaries of the primary particles and the surfaces of the secondary particles were tested to obtain differences in contents of Co. The specific test results were shown in Table 3. The compositions of Ni, Co and Mn were average results tested on a plurality of points.

TABLE 3

(Total content of Ni, Co and Mn was taken as 100 mole %)

| Cathode material | Centers of primary particles | | | Grain boundaries of primary particles | | | Surfaces of secondary particles | | | K2 − K1 | K3 − K1 |
|---|---|---|---|---|---|---|---|---|---|---|---|
| In mole % | Ni | Co (K1) | Mn | Ni | Co (K2) | Mn | Ni | Co (K3) | Mn | / | / |
| Example 1 | 80 | 10 | 10 | 78.9 | 11.5 | 9.6 | 74.8 | 15.9 | 9.3 | 1.5 | 5.9 |
| Example 2 | 80 | 10 | 10 | 79.4 | 10.8 | 9.8 | 74.2 | 17.1 | 8.7 | 0.8 | 7.1 |
| Example 3 | 80 | 10 | 10 | 78.3 | 12.3 | 9.4 | 76.2 | 14.3 | 9.5 | 2.3 | 4.3 |
| Example 4 | 80 | 10 | 10 | 79.6 | 10.5 | 9.9 | 78.8 | 11.7 | 9.5 | 0.5 | 1.7 |
| Example 5 | 95 | 3 | 2 | 93.7 | 4.6 | 1.7 | 89.4 | 8.1 | 2.5 | 1.6 | 5.1 |
| Comparative Example 1 | 80 | 10 | 10 | 79.8 | 10.2 | 10 | 72.2 | 18.5 | 9.3 | 0.2 | 8.5 |
| Comparative Example 2 | 80 | 10 | 10 | / | / | / | 72.3 | 18.6 | 9.1 | / | 8.6 |
| Comparative Example 3 | 80 | 10 | 10 | / | / | / | / | / | / | / | / |

Table 3 reveals that: if the primary particles in the cathode material are relatively large, the grain boundaries between the primary particles are relatively large, and more Co enters the grain boundaries; and if the primary particles are relatively small, Co cannot easily enter the grain boundaries and thus most of Co was coated on surfaces of the secondary particles of the material.

(4) Electrochemical Performance Test

In the present disclosure, the electrochemical performances, including first discharge specific capacity at 0.1C, discharge specific capacity at 1C, rate capability, and cycle performance, of the cathode materials prepared in the above-mentioned examples and comparative examples were tested. The specific test results were shown in Table 4. The discharge specific capacity at 1C was test at a temperature of 25° C.

TABLE 4

| | Items | | | |
|---|---|---|---|---|
| | First discharge specific capacity | Discharge specific capacity | Rate capability | Capacity retention ratio |
| | Unit | | | |
| | 0.1 C/mAh/g | 1.0 C/mAh/g | 1.0 C/0.1 C | 80 cycles at 45° C./% |
| Example 1 | 202.1 | 187.3 | 0.927 | 95.4 |
| Example 2 | 202.5 | 187.2 | 0.924 | 94.3 |
| Example 3 | 201.5 | 185.7 | 0.922 | 96.1 |
| Example 4 | 203.2 | 186.2 | 0.916 | 93.6 |
| Example 5 | 218.5 | 201.8 | 0.924 | 91.1 |
| Comparative Example 1 | 201.1 | 184.3 | 0.916 | 89.2 |
| Comparative Example 2 | 196.8 | 179.5 | 0.912 | 94.6 |
| Comparative Example 3 | 200.2 | 181.4 | 0.906 | 89.1 |

It can be seen from Table 4 that: in comparison with Example 1, the temperature of sintering of Example 2 was lower, the material of Example 2 has smaller primary particles, less Co at the grain boundaries, more Co at the outside, and has poorer cycle performance; in comparison with Example 1, the temperature of sintering of Example 3 was higher, the material of Example 3 has greater primary particles, more Co at the grain boundaries, less Co at the outside, and has poorer capacity rate; and in comparison with Example 1, the material of Example 4 was coated with less Co, and thus Co at the grain boundaries and the surfaces are both less, and have poorer rate and cycle performances. Further, the material of Comparative Example 1 is the agglomerated material, which has small in primary particles and is compact in structure. Thus, for the material of Comparative Example 1, Co cannot enter the interior of the secondary particles along the grain boundaries, and thus Co at the grain boundaries is extremely low, such that the material has poor rate and cycle performances. The material in Comparative Example 2 is the single crystal material having large primary particles, and the primary particles are separated and independent from each other. Thus, for the material of Comparative Example 2, Co is enriched on the surface of the material, and thus the material has poor rate and cycle performances.

The preferred embodiments of the present disclosure are described above in detail. However, the present disclosure is not limited thereto. Within the scope of the technical conception of the present disclosure, various simple modifications including combinations of various technical features in any other appropriate ways can be made to the technical solutions of the present disclosure. These simple modifications and combinations should be also regarded as the contents disclosed in the present disclosure and should fall within the protection scope of the present disclosure.

What is claimed is:

1. An agglomeration-like multi-element cathode material, having a structure represented by formula I:

$$Li_aNi_xCO_yMn_zMbO_2 \quad \text{formula I;}$$

where: $0.9 \le a \le 1.1$, $0.5 \le x < 1$, $0 < y < 0.5$, $0 < z < 0.5$, and $0 \le b < 0.05$; and M is at least one of V, Ta, Cr, La, Al, Ce, Er, Ho, Y, Mg, Sr, Ba, Ra, Zr, Fe, Ca, Zn, B, W, Nb, Cd, Pb, Si, Mo, Cu, Sr, and Ti, wherein the multi-element cathode material is secondary particles formed by agglomeration of primary particles, the primary particles having a spherical shape and having an average particle size $D_S$ ranging from 1.2 μm to 1.8 μm, the secondary particles having an average particle size $D_L$ ranging from 7 μm to 13 μm, and a value of $D_L/D_S$ ranging from 7 to 12, the average particle size $D_L$ being measure by means of scanning electron microscope;

wherein grain boundaries of the primary particles and surfaces of the secondary particles are rich in Co; and wherein: a molar percentage of Co at centers of the primary particles is defined as K1, a molar percentage of Co at the grain boundaries of the primary particles is defined as K2, and a molar percentage of Co on the surfaces of the secondary particles is defined as K3, where: $K2-K1 \ge 0.5\%$, and $K3-K1 \ge 1.5\%$; and wherein a value of a full width at half maximum (FWHM) (104) of a characteristic peak (104) of an X-ray diffraction(XRD) test of the agglomeration-like multi-element cathode material ranges from 0.202 to 0.23.

2. The agglomeration-like multi-element cathode material according to claim 1, wherein $K2-K1 > 1\%$; and $K3-K1 \ge 3\%$.

3. The agglomeration-like multi-element cathode material according to claim 1, wherein:

in formula I, $1 < a \le 1.1$, and $0.0005 < b < 0.01$; and/or

M is at least one of Mg, W, V, Ti, La, Nb, Si, Al and B.

4. The agglomeration-like multi-element cathode material according to claim 1, wherein:

the agglomeration-like multi-element cathode material has a Brunauer-Emmett-Teller (BET) specific surface area ranging from 0.1 $m^2/g$ to 0.4 $m^2/g$; and/or the agglomeration-like multi-element cathode material has $D_{50}$ ranging from 5 μm to 15 μm.

5. The agglomeration-like multi-element cathode material according to claim 4, wherein:

the agglomeration-like multi-element cathode material has a Brunauer-Emmett-Teller (BET) specific surface area ranging from 0.2 $m^2/g$ to 0.3 $m^2/g$; and/or the agglomeration-like multi-element cathode material has $D_{50}$ ranging from 7 μm to 13 μm.

6. A preparation method for the agglomeration-like multi-element cathode material according to claim 1, the preparation method comprising:

(1) mixing a nickel source, a first cobalt source, a manganese source, a complexing agent, and a precipitant for co-precipitation reaction to obtain slurry; and performing aging, filter-pressing, washing, and drying on the slurry in sequence, to obtain a nickel cobalt manganese ternary precursor;

(2) mixing the nickel cobalt manganese ternary precursor and a lithium source for first high-temperature sintering, and performing crushing and sieving in sequence, to obtain an agglomeration-like cathode material in-process product, wherein a temperature of the first high-temperature sintering is defined as T, a range of T satisfying formula II:

$$\frac{1700}{lg(C_{Ni}*100)}+50*lgD_L-100\leq T\leq\frac{1700}{lg(C_{Ni}*100)}+50*lgD_L, \quad \text{formula II}$$

where $C_{Ni}$ is a molar percentage of element Ni in a mixture consisting of the nickel source, the first cobalt source, and the manganese source, the average particle size DI being measure by means of scanning electron microscope; and (3) mixing the agglomeration-like cathode material in-process product and a second cobalt source for second high-temperature sintering, and performing crushing and sieving in sequence, to obtain the agglomeration-like multi-element cathode material, wherein based on a stoichiometric ratio, dosage of the second cobalt source satisfies: $0.005[n(Co^2)]/[n(Ni)+n(Co^1)+n(Mn)]<0.1$.

7. The preparation method according to claim 6, wherein in step (1):

a pH value of the co-precipitation reaction ranges from 11.8 to 13; and/or a temperature of the co-precipitation reaction ranges from 40° C. to 80° C., a duration of the co-precipitation reaction ranges from 5 hours to 40 hours, and a rotating speed of the co-precipitation reaction ranges from 300 rpm to 900 rpm; and/or the nickel cobalt manganese ternary precursor has a BET specific surface area ranging from 7 $m^2/g$ to 14 $m^2/g$; and/or the nickel cobalt manganese ternary precursor has $D_{50}$ ranging from 5 μm to 15 μm.

8. The preparation method according to claim 7, wherein, in step (1), the nickel cobalt manganese ternary precursor has $D_{50}$ ranging from 7 μm to 13 μm.

9. The preparation method according to claim 6, wherein in step (2):

the range of T satisfying formula III:

$$\frac{1700}{lg(C_{Ni}*100)}+25*lgD_L-50\leq T\leq\frac{1700}{lg(C_{Ni}*100)}+25*lgD_L \quad \text{formula III}$$

and/or a duration of the first high-temperature sintering ranges from 10 hours 30 hours, and a sintering atmosphere is provided by an oxygen-containing gas; and/or the agglomeration-like cathode material in-process product has $D_{50}$ ranging from 5 μm to 15 μm; and/or wherein based on a stoichiometric ratio, a dosage of the lithium source satisfies: $0.9\leq[n(Li)]/[n(Ni)+n(Co^1)+n(Mn)]\leq1.1$.

10. The preparation method according to claim 9, wherein, in step (2):

the agglomeration-like cathode material in-process product has $D_{50}$ ranging from 7 μm to 13 μm; and/or wherein based on a stoichiometric ratio, the dosage of the lithium source satisfies: $1.02\leq[n(Li)]/[n(Ni)+n(Co^1)+n(Mn)]\leq1.06$.

11. The preparation method according to claim 6, wherein in step (3):

conditions of the second high-temperature sintering comprise: a temperature ranging from 200° C. to 1,000° C., a duration ranging from 5 hours to 20 hours, and a sintering atmosphere being provided by oxygen-containing gas; and/or the second cobalt source is selected from at least one of cobalt oxide, cobalt (III) hydroxide, cobalt oxyhydroxide, cobalt fluoride, cobalt (II) hydroxide, cobalt tetroxide, cobalt carbonate, and cobalt acetate; and/or based on a stoichiometric ratio, the dosage of the second cobalt source satisfies: $0.005\leq[n(Co^2)]/[n(Ni)+n(Co^1)+n(Mn)]\leq0.1$.

12. The preparation method according to claim 11, wherein in step (3), the second cobalt source is selected from at least one of cobalt oxide, cobalt (III) hydroxide, cobalt tetroxide, cobalt oxyhydroxide, and cobalt (II) hydroxide.

13. The preparation method according to claim 11, wherein the second cobalt source is cobalt tetroxide.

14. The preparation method according to claim 6, wherein:

an additive is further mixed in step (1); and/or a dopant is further mixed in step (2); and/or a coating agent is further mixed in step (3), wherein the additive, the dopant, and the coating agent are the same or different and are each independently selected from an M-containing compound.

15. The preparation method according to claim 14, wherein the additive, the dopant, and the coating agent are the same or different and each independently selected from at least one of oxide, fluoride, hydroxide, oxyhydroxide, carbonate, nitrate, sulfate, and acetate that contain M.

16. The preparation method according to claim 14, wherein:

the dopant is selected from at least one of MgO, $WO_3$, $TiO_2$, $Nb_2O_5$, and $Al_2O_3$; and/or the coating agent is selected from at least one of $V_2O_5$, $La_2O_3$, $SiO_2$, and $B_2O_3$.

17. A lithium-ion battery, comprising an agglomeration-like multi-element cathode material, the agglomeration-like multi-element cathode material having a structure represented by formula I:

$$Li_aNi_xCo_yMn_zMbO_2 \quad \text{formula I;}$$

where: $0.9\leq a\leq1.1$, $0.5\leq x<1$, $0<y<0.5$, $0<z<0.5$, and $0\leq b<0.05$; and M is at least one of V, Ta, Cr, La, Al, Ce, Er, Ho, Y, Mg, Sr, Ba, Ra, Zr, Fe, Ca, Zn, B, W, Nb, Cd, Pb, Si, Mo, Cu, Sr, and Ti, wherein the multi-element cathode material is secondary particles formed by agglomeration of primary particles, the primary particles having a spherical shape and having an average particle size $D_S$ ranging from 1.2 μm to 1.8 μm, the secondary particles having an average particle size $D_L$ ranging from 7 μm to 13 μm, and a value of $D_L/D_S$ ranging from 7 to 12, the average particle size $D_L$ being measure by means of scanning electron microscope;

wherein grain boundaries of the primary particles and surfaces of the secondary particles are rich in Co; and wherein: a molar percentage of Co at centers of the primary particles is defined as K1, a molar percentage of Co at the grain boundaries of the primary particles is defined as K2, and a molar percentage of Co on the surfaces of the secondary particles is defined as K3, where: K2−K1≥0.5%, and K3−K1≥1.5%; and wherein a value of a full width at half maximum $(FWHM)_{(104)}$ of a characteristic peak (104) of an X-ray diffraction(XRD) test of the agglomeration-like multi-element cathode material ranges from 0.202 to 0.23.

18. The lithium-ion battery according to claim 17, wherein: $K2-K1\geq1\%$; and $K3-K1\geq3\%$.

19. The lithium-ion battery according to claim 17, wherein:

in formula I, $1\leq a\leq1.1$, and $0.0005\leq b\leq0.01$; and/or

M is at least one of Mg, W, V, Ti, La, Nb, Si, Al and B.

20. The lithium-ion battery according to claim 17, wherein:

the agglomeration-like multi-element cathode material has a Brunauer-Emmett-Teller (BET) specific surface area ranging from 0.1 $m^2/g$ to 0.4 $m^2/g$; and/or the agglomeration-like multi-element cathode material has $D_{50}$ ranging from 5 μm to 15 μm.

* * * * *